US012673315B2

(12) United States Patent
Leflaive et al.

(10) Patent No.: US 12,673,315 B2
(45) Date of Patent: *Jul. 7, 2026

(54) METHOD FOR HYDRODESULFURIZATION IN THE PRESENCE OF A CATALYST ON A MESOPOROUS-MACROPOROUS SUBSTRATE

(71) Applicant: IFP Energies nouvelles, Rueil-Malmaison (FR)

(72) Inventors: Philibert Leflaive, Rueil-Malmaison Cedex (FR); Etienne Girard, Rueil-Malmaison Cedex (FR); Antoine Fecant, Rueil-Malmaison Cedex (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 580 days.

This patent is subject to a terminal disclaimer.

(21) Appl. No.: 18/036,540

(22) PCT Filed: Nov. 18, 2021

(86) PCT No.: PCT/EP2021/082066
§ 371 (c)(1),
(2) Date: May 11, 2023

(87) PCT Pub. No.: WO2022/112078
PCT Pub. Date: Jun. 2, 2022

(65) Prior Publication Data
US 2023/0415131 A1 Dec. 28, 2023

(30) Foreign Application Priority Data
Nov. 27, 2020 (FR) ........................................ 2012317

(51) Int. Cl.
| | |
|---|---|
| *B01J 23/882* | (2006.01) |
| *B01J 6/00* | (2006.01) |
| *B01J 21/04* | (2006.01) |
| *B01J 35/61* | (2024.01) |
| *B01J 35/64* | (2024.01) |
| *B01J 37/02* | (2006.01) |
| *C10G 45/08* | (2006.01) |

(52) U.S. Cl.
CPC .............. *B01J 23/882* (2013.01); *B01J 6/001* (2013.01); *B01J 21/04* (2013.01); *B01J 35/613* (2024.01); *B01J 35/615* (2024.01);
*B01J 35/647* (2024.01); *B01J 35/651* (2024.01); *B01J 35/653* (2024.01); *B01J 37/0201* (2013.01); *C10G 45/08* (2013.01); *C10G 2300/1037* (2013.01); *C10G 2400/02* (2013.01)

(58) Field of Classification Search
None
See application file for complete search history.

(56) References Cited

U.S. PATENT DOCUMENTS

| | | | | |
|---|---|---|---|---|
| 4,908,344 | A | * | 3/1990 | Pereira ..................... B01J 35/66 |
| | | | | 502/313 |
| 6,589,908 | B1 | | 7/2003 | Ginestra et al. |
| 7,807,044 | B2 | | 10/2010 | Roy-Auberger et al. |
| 7,981,828 | B2 | | 7/2011 | Devers et al. |
| 10,562,014 | B2 | | 2/2020 | Krueger et al. |
| 2009/0321320 | A1 | | 12/2009 | Wu et al. |
| 2015/0314282 | A1 | | 11/2015 | Bhan et al. |

FOREIGN PATENT DOCUMENTS

| | | |
|---|---|---|
| CA | 2615225 A1 | 6/2008 |
| CN | 109894122 A | 6/2019 |

OTHER PUBLICATIONS

International search report PCT/EP2021/082066 dated Jan. 20, 2022 (pp. 1-2).

* cited by examiner

*Primary Examiner* — Keling Zhang
(74) *Attorney, Agent, or Firm* — Millen, White, Zelano & Branigan, P.C.; Brion P. Heaney

(57) ABSTRACT

For hydrodesulfurization of an olefinic gasoline cut containing sulfur, the gasoline cut, hydrogen, and a catalyst are brought into contact. The catalyst comprises a group VIB metal, a group VIII metal, and a mesoporous and macroporous alumina substrate having a bimodal mesopore distribution. The volume of mesopores having a diameter greater than or equal to 2 nm and less than 18 nm corresponds to between 10 and 30% by volume of the total pore volume of the substrate. The volume of mesopores having a diameter greater than or equal to 18 nm and less than 50 nm corresponds to between 30 and 50% by volume of the total pore volume of the substrate. The volume of macropores having a diameter greater than or equal to 50 nm and less than 8000 nm corresponds to between 30 and 50% by volume of the total pore volume of the substrate.

17 Claims, No Drawings

METHOD FOR HYDRODESULFURIZATION IN THE PRESENCE OF A CATALYST ON A MESOPOROUS-MACROPOROUS SUBSTRATE

TECHNICAL FIELD

The present invention relates to the field of hydrotreating gasoline cuts, notably gasoline cuts resulting from fluidized-bed catalytic cracking units. More particularly, the present invention relates to the use of a catalyst in a process for the hydrodesulfurization of an olefinic gasoline cut containing sulfur, such as the gasolines resulting from catalytic cracking, for which it is desired to reduce the content of sulfur compounds, without hydrogenating the olefins and the aromatics.

PRIOR ART

Petroleum refining and also petrochemistry are now subject to new constraints. This is because all countries are gradually adopting strict sulfur specifications, the objective being to achieve, for example, 10 ppm (by weight) of sulfur in commercial gasolines in Europe and in Japan. The problem of reducing sulfur contents is essentially focused on gasolines obtained by cracking, whether catalytic (FCC, Fluid Catalytic Cracking) or noncatalytic (coking, visbreaking, steam cracking), the main precursors of sulfur in gasoline pools.

One solution, well known to those skilled in the art, for reducing the sulfur content consists in carrying out a hydrotreating (or hydrodesulfurization) of the hydrocarbon cuts (and notably of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is notably linked to the hydrogenation of the olefins present in this type of gasoline concomitantly with the hydrodesulfurization. Unlike other hydrotreating processes, the hydrodesulfurization of gasolines thus has to make it possible to respond to a conflicting twofold constraint: to provide deep hydrodesulfurization of gasolines and to limit the hydrogenation of the unsaturated compounds present.

One way for confronting this twofold problem consists in employing hydrodesulfurization catalysts which are both active in hydrodesulfurization and also very selective for hydrodesulfurization relative to the olefin hydrogenation reaction.

Thus, in the prior art, document US 2009/321320 is known, which discloses hydrodesulfurization catalysts comprising an active metal phase containing cobalt/molybdenum and a support based on high-temperature alumina (i.e. alumina calcined at a temperature above 800° C.) and containing less than 50% by weight of gamma, eta and chi alumina, and with a specific surface area of between 40 and 200 m$^2$/g. The catalysts are obtained by dry impregnation of an aqueous solution containing cobalt, molybdenum and at least one additive in the form of an organic compound.

Document EP 1892039 describes selective hydrodesulfurization catalysts comprising at least one support, at least one group VIII element, at least one group VIB element and phosphorus, in which the support can essentially consist of at least one transition alumina, that is to say that it comprises at least 51% by weight of transition alumina, said support possibly having a specific surface area of less than 135 m$^2$/g.

Furthermore, it is known from the prior art that the pore distribution of the catalyst supports can have a beneficial impact on catalytic performance, notably the fact of having multimodal porosities.

Document CN109894122 discloses a process for the hydrodesulfurization of a catalytic cracking (FCC) gasoline in the presence of a catalyst comprising an active phase based on cobalt and molybdenum, alkaline dopants, and a mesoporous and macroporous alumina support, with a specific surface area of between 260 and 290 m$^2$/g, a total pore volume of between 0.8 and 2.2 ml/g, pores with a diameter of between 10 and 200 nm, in which the volume of the pores with a diameter of between 10 and 50 nm represents between 10% and 50% of the total pore volume of the support, and the volume of pores with a diameter of between 50 and 200 nm represents between 50% and 90% of the total pore volume of the support. The support used comprises a monomodal distribution of mesopores and a monomodal distribution of macropores.

Document CN109420504 discloses a process for the hydrodesulfurization of a catalytic cracking (FCC) gasoline in the presence of a catalyst comprising an active phase based on cobalt and molybdenum, and a mesoporous and macroporous alumina support, in which the volume of the pores with a diameter of between 60 and 200 nm represents between 1% and 80% of the total pore volume of the support, and the volume of pores with a diameter of between 5 and 50 nm represents between 20% and 70% of the total pore volume of the support. The support used comprises a monomodal distribution of mesopores and a monomodal distribution of macropores.

Document U.S. Pat. No. 6,589,908 discloses a process for preparing a catalyst support, which does not contain macroporosity and has a bimodal pore structure in the mesoporosity such that the two modes of porosity are separated by 1 to 20 nm.

There thus still exists today a keen interest among refiners for hydrodesulfurization catalysts, notably for the hydrodesulfurization of gasoline cuts, which have improved catalytic performance, notably in terms of catalytic activity in hydrodesulfurization and/or of selectivity, and which thus, once used, make it possible to produce a low-sulfur gasoline without severe reduction in the octane number.

In this context, one of the objectives of the present invention is to provide a process for the hydrodesulfurization of a sulfur-containing olefinic gasoline cut, in the presence of a supported catalyst having a performance in terms of activity and selectivity, at least as good, or even better, than the processes known from the prior art.

Subjects of the Invention

The present invention relates to a process for the hydrodesulfurization of a sulfur-containing olefinic gasoline cut, wherein said gasoline cut, hydrogen and a catalyst are brought into contact, said hydrodesulfurization process being carried out at a temperature of between 200° C. and 400° C., a total pressure of between 1 and 3 MPa, an hourly space velocity, defined as being the volume flow rate of feedstock relative to the volume of catalyst, of between 1 and 10 h$^{-1}$ and a hydrogen/gasoline cut volume ratio of between 100 and 600 NI/I, said catalyst comprising at least one group VIB metal, at least one group VIII metal, and a macroporous and alumina mesoporous support comprising a bimodal distribution of mesopores, and wherein:

the volume of mesopores with a diameter greater than or equal to 2 nm and less than 18 nm corresponds to between 10% and 30% by volume of the total pore volume of said support;

the volume of mesopores with a diameter greater than or equal to 18 nm and less than 50 nm corresponds to between 30% and 50% by volume of the total pore volume of said support;

the volume of macropores with a diameter greater than or equal to 50 nm and less than 8000 nm corresponds to between 30% and 50% by volume of the total pore volume of said support;

The applicant has surprisingly discovered that the use of a catalyst based on at least one group VIB metal, at least one group VIII metal, on a mesoporous and macroporous support, having both a bimodal mesoporous porosity, with a high mesoporous volume coupled with a given macropore volume, makes it possible to improve the catalytic performance of said process, in terms of catalytic activity and in terms of selectivity. This results in a better conversion of the feedstock under identical operating conditions to those used in the prior art. Specifically, without being bound to any scientific theory, the use of such a catalyst in a gasoline hydrodesulfurization process improves the phenomena of internal diffusion of reactants and products by the presence of populations of different sizes of mesopores. In addition, the combined presence of macroporosity is particularly well advised when the feedstock to be treated contains a significant amount of reactive olefins (unsaturated compounds), notably diolefins, which is the case for gasolines, which can give rise to the formation of gums and thus block the porosity of the catalyst without the presence of macroporosity. The optimization of the porosity ranges of the catalysts therefore constitutes a decisive element regarding the performance in a gasoline hydrodesulfurization process.

According to one or more embodiments, said support comprises a specific surface area of between 50 and 210 m$^2$/g.

According to one or more embodiments, said support comprises a total pore volume of between 0.7 and 1.3 ml/g.

According to one or more embodiments, the volume of mesopores with a diameter greater than or equal to 2 nm and less than 18 nm corresponds to between 15% and 25% by volume of the total pore volume of said support.

According to one or more embodiments, the volume of mesopores with a diameter greater than or equal to 18 nm and less than 50 nm corresponds to between 35% and 45% by volume of the total pore volume of said support.

According to one or more embodiments, the volume of macropores with a diameter greater than or equal to 50 nm and less than 8000 nm corresponds to between 35% and 50% by volume of the total pore volume of said support.

According to one or more embodiments, the content of metal from group VIb of said catalyst, expressed in oxide form, is of between 1% and 30% by weight, with respect to the total weight of the catalyst.

According to one or more embodiments, the content of group VIII metal in said catalyst, expressed in oxide form, is between 0.5% and 10% by weight relative to the total weight of the catalyst.

According to one or more embodiments, the group VIII metal is cobalt.

According to one or more embodiments, the group VIB metal is molybdenum.

According to one or more embodiments, said catalyst further comprises phosphorus, the content of phosphorus, expressed in P$_2$O$_5$ form, is between 0.1% and 10% by weight relative to the total weight of said catalyst.

According to one or more embodiments, the pore distribution of the mesopores with a diameter greater than or equal to 2 nm and less than 18 nm is centered on a range of values of between 10.5 and 14.5 nm.

According to one or more embodiments, the pore distribution of the mesopores with a diameter greater than or equal to 18 nm and less than 50 nm is centered on a range of values of between 22 and 28 nm.

According to one or more embodiments, the gasoline is a catalytic cracking gasoline.

According to one or more embodiments, the support is in the form of beads with a diameter of between 2 and 4 mm.

According to one or more embodiments, said support in the form of beads is obtained according to the following steps:

s1) dehydrating an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;

s2) shaping said alumina powder obtained in step s1) in the form of beads;

s3) heat treating the alumina beads obtained in step s2) at a temperature above or equal to 200° C.;

s4) hydrothermally treating the alumina beads obtained on conclusion of step s3) by impregnation with water or an aqueous solution, then residence in an autoclave at a temperature of between 100° C. and 300° C.;

s5) calcining the alumina beads obtained at the end of step s4) at a temperature of between 500° C. and 820° C.

DETAILED DESCRIPTION OF THE INVENTION

1. Definitions

In the text hereinbelow, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

The BET specific surface area is measured by nitrogen physisorption according to the standard ASTM D3663-03, a method described in the work by Rouquerol F., Rouquerol J. and Singh K., "*Adsorption by Powders & Porous Solids*: Principles, Methodology and Applications", Academic Press, 1999.

In the present description, according to the IUPAC convention, "micropores" are understood to mean the pores having a diameter of less than 2 nm, i.e. 0.002 μm; "mesopores" are understood to mean the pores having a diameter of greater than 2 nm, i.e. 0.002 μm, and less than 50 nm, i.e. 0.05 μm, and "macropores" are understood to mean the pores having a diameter of greater than or equal to 50 nm, i.e. 0.05 μm.

In the following description of the invention, the "total pore volume" of the alumina or of the catalyst is understood to mean the volume measured by mercury porosimetry according to the standard ASTM D4284-83 at a maximum pressure of 4000 bar (400 MPa), using a surface tension of 484 dyne/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-5, written by Jean Charpin and Bernard Rasneur.

In order to obtain better accuracy, the value of the total pore volume in ml/g that is given in the text which follows corresponds to the value of the total mercury volume (total pore volume measured by mercury intrusion porosimetry) in ml/g measured on the sample minus the value of the mercury volume in ml/g measured on the same sample for a pressure corresponding to 30 psi (approximately 0.2 MPa).

The volume of the macropores and of the mesopores is measured by mercury intrusion porosimetry according to the standard ASTM D4284-83 at a maximum pressure of 4000 bar (400 MPa), using a surface tension of 484 dyne/cm and a contact angle of 140°.

The value at and above which the mercury fills all the intergranular voids is set at 0.2 MPa and it is considered that, above this value, the mercury penetrates into the pores of the sample.

The macropore volume of the catalyst is defined as being the cumulative volume of mercury introduced at a pressure of between 0.2 MPa and 30 MPa, corresponding to the volume contained in the pores with an apparent diameter of greater than 50 nm.

The mesopore volume of the catalyst is defined as being the cumulative volume of mercury introduced at a pressure of between 30 MPa and 400 MPa, corresponding to the volume contained in the pores with an apparent diameter of between 2 and 50 nm.

When the incremental pore volume measured by mercury porosimetry is plotted as a function of the pore diameter, the porosity modes correspond to the inflection points of the function represented.

The metallic element (group VIII metal, group VIB metal) and phosphorus contents are measured by X-ray fluorescence.

2. Description

Catalyst

The catalyst used in the context of the hydrodesulfurization process according to the invention comprises an active phase comprising, preferably consisting of, at least one group VIB metal, at least one group VIII metal and optionally phosphorus.

The group VIB metal present in the active phase of the catalyst is preferentially chosen from molybdenum and tungsten, more preferentially molybdenum. The group VIII metal present in the active phase of the catalyst is preferentially chosen from cobalt, nickel and the mixture of these two elements, more preferentially cobalt.

The total content of group VIII metal is generally between 0.5% and 10% by weight, expressed in the form of oxide of the group VIII metal, relative to the total weight of the catalyst, preferably between 1% and 10% by weight, preferably between 1% and 7% by weight, very preferably between 1% and 6% by weight and even more preferably between 1.5% and 5% by weight, relative to the total weight of the catalyst. When the metal is cobalt or nickel, the metal content is expressed as CoO or NiO respectively.

The content of group VIB metal is generally between 1% and 30% by weight, expressed in the form of oxide of the group VIB metal, relative to the total weight of the catalyst, preferably between 3% and 20% by weight, preferably between 5% and 18% by weight, very preferably between 7% and 14% by weight, relative to the total weight of the catalyst. When the metal is molybdenum or tungsten, the metal content is expressed as $MoO_3$ or $WO_3$ respectively.

The content of phosphorus, when it is present in the catalyst, is between 0.1% and 10% by weight of $P_2O_5$, relative to the total weight of catalyst, preferably between 0.5% and 5% by weight of $P_2O_5$, relative to the total weight of catalyst, and even more preferentially between 1% and 3% by weight of $P_2O_5$, relative to the total weight of catalyst.

The catalyst generally comprises a specific surface area of between 50 and 200 $m^2/g$, preferably between 60 and 170 $m^2/g$ and preferably between 70 and 130 $m^2/g$.

The pore volume of the catalyst is generally between 0.5 ml/g and 1.3 ml/g, and preferably between 0.6 ml/g and 1.1 ml/g.

Alumina Support

The alumina support of the catalyst used in the context of the hydrodesulfurization process according to the invention is a macroporous and mesoporous alumina support comprising a bimodal distribution of mesopores, wherein:

the volume of mesopores with a diameter greater than or equal to 2 nm and less than 18 nm corresponds to between 10% and 30% by volume of the total pore volume of said support;

the volume of mesopores with a diameter greater than or equal to 18 nm and less than 50 nm corresponds to between 30% and 50% by volume of the total pore volume of said support;

the volume of macropores with a diameter greater than or equal to 50 nm and less than 8000 nm corresponds to between 30% and 50% by volume of the total pore volume of said support;

Preferably, the volume of the mesopores of the support with a diameter greater than or equal to 2 nm and less than 18 nm corresponds to between 15% and 25% by volume of the total pore volume of said support.

Preferably, the volume of the mesopores of the support with a diameter greater than or equal to 18 nm and less than 50 nm corresponds to between 35% and 45% by volume of the total pore volume of said support.

Preferably, the volume of the macropores of the support with a diameter greater than or equal to 50 nm and less than 8000 nm corresponds to between 35% and 50% by volume of the total pore volume of said support.

In one embodiment according to the invention, the pore distribution of the mesopores with a diameter greater than or equal to 2 nm and less than 18 nm is centered on a range of values of between 10.5 and 14.5 nm, preferably between 12 and 13 nm.

In one embodiment according to the invention, the pore distribution of the mesopores with a diameter greater than or equal to 18 nm and less than 50 nm is centered on a range of values of between 22 and 28 nm, preferably between 23 and 27 nm.

The support generally comprises a specific surface area of between 50 and 210 $m^2/g$, preferably between 70 and 180 $m^2/g$ and even more preferably between 70 and 160 $m^2/g$.

The pore volume of the support is generally between 0.7 ml/g and 1.3 ml/g, and preferably between 0.8 ml/g and 1.2 ml/g.

Advantageously, the support is in the form of beads with a diameter of between 0.8 and 10 mm, preferentially between 1 and 5 mm, and more preferentially between 2 and 4 mm.

Process for Preparing the Support

The alumina support of the catalyst used in the context of the hydrodesulfurization process according to the invention can be synthesized by any method known to those skilled in the art.

According to a preferred embodiment, the alumina support used according to the invention is in the form of beads. According to this preferred embodiment, the preparation of the support comprises the following steps:

s1) dehydrating an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;

s2) shaping said alumina powder obtained in step s1) in the form of beads;

s3) heat treating the beads obtained in step s2) at a temperature above or equal to 200° C.;

s4) hydrothermally treating said alumina beads obtained on conclusion of step s3) by impregnation with water or an aqueous solution, preferentially an acidic aqueous solution, then residence in an autoclave at a temperature of between 100° C. and 300° C., preferably between 150° C. and 250° C.;

s5) calcining the alumina beads obtained on conclusion of step s4) at a temperature of between 500° C. and 820° C.

Steps s1) to s5) are described in detail below.

Step s1)

According to step s1), an aluminum hydroxide or an aluminum oxyhydroxide is dehydrated at a temperature of between 400° C. and 1200° C., preferably between 600° C. and 900° C., for a time of between 0.1 second and 5 seconds, preferably between 0.1 second and 4 seconds, to obtain an alumina powder. The aluminum hydroxide can be chosen from hydrargillite, gibbsite or bayerite. The aluminum oxyhydroxide can be chosen from boehmite or diaspore. Preferably, step s1) is carried out by using hydrargillite.

Generally, step s1) is carried out in the presence of a stream of hot gas, such as dry air or moist air, making it possible to quickly remove and entrain the evaporated water.

Generally, the active alumina powder obtained after the dehydration of the aluminum hydroxide or oxyhydroxide is ground to a particle size of between from 10 to 200 μm.

Generally, the active alumina powder obtained after the dehydration of the aluminum hydroxide or oxyhydroxide is washed with water or an acidic aqueous solution. When the washing step is carried out with an acidic aqueous solution, any mineral or organic acid can be used, preferably nitric acid, hydrochloric acid, perchloric acid or sulfuric acid for the mineral acids, and a carboxylic acid (formic, acetic or malonic acid), a sulfonic acid (para-toluenesulfonic acid) or a sulfuric ester (lauryl sulfate) for the organic acids.

Step s2)

According to step s2), said alumina powder obtained on conclusion of step s1) is shaped.

The shaping of said alumina powder is carried out so as to obtain beads, which is referred to as granulation, and is generally carried out by means of a rotating technology, such as a rotating granulator or a rotating drum. This type of process makes it possible to obtain beads with a diameter and with pore distributions which are controlled, these dimensions and these distributions generally being created during the agglomeration step.

The porosity can be created by various means, such as the choice of the particle size distribution of the alumina powder or the agglomeration of several alumina powders with different particle size distributions. Another method consists in mixing, with the alumina powder, before or during the agglomeration step, one or more compounds, known as pore-forming compounds, which disappear by heating and which thus create a porosity in the beads. As pore-forming compounds used, mention may be made, by way of example, of wood flour, charcoal, activated carbon, carbon black, sulfur, tars, plastics or emulsions of plastics, such as polyvinyl chloride, polyvinyl alcohols, naphthalene or the like. The amount of pore-forming compounds added is determined by the volume desired to obtain beads with a green filling density of between 500 and 1100 kg/m³, preferentially between 700 and 950 kg/m³, and with a diameter of between 0.8 and 10 mm, preferentially between 1 and 5 mm, and even more preferentially between 2 and 4 mm. The beads obtained can be selected by screening according to the desired particle size.

Step s3)

According to step s3), a heat treatment of the alumina powder shaped in the form of beads obtained on conclusion of step s2) is carried out at a temperature above or equal to 200° C., preferably of between 200° C. and 1200° C., preferentially between 300° C. and 900° C., very preferentially between 400° C. and 750° C., for a period of time of generally between 1 and 24 hours, preferably between 1 and 6 hours. The beads obtained in this intermediate step comprise a specific surface area of between 50 and 420 m²/g, preferably between 60 and 350 m²/g, and even more preferentially between 80 and 300 m²/g.

Step s4)

According to step s4), the alumina beads obtained on conclusion of step s3) are subjected to a hydrothermal treatment by impregnation with water or an aqueous solution, preferentially an acidic aqueous solution, then residence in an autoclave at a temperature of between 100° C. and 300° C., preferably between 150° C. and 250° C.

The hydrothermal treatment is generally carried out at a temperature of from 100° C. to 300° C., preferentially from 150° C. to 250° C., for a period of time of greater than 45 minutes, preferentially from 1 to 24 hours, very preferentially from 1.5 to 12 hours. The hydrothermal treatment is generally carried out using an acidic aqueous solution comprising one or more mineral and/or organic acids, preferably nitric acid, hydrochloric acid, perchloric acid, sulfuric acid or weak acids, the solution of which has a pH of less than 4, such as acetic acid or formic acid. Generally, said acidic aqueous solution also comprises one or more compounds capable of releasing anions capable of combining with aluminum ions, preferably compounds comprising a nitrate ion (such as aluminum nitrate), chloride, sulfate, perchlorate, chloroacetate, trichloroacetate, bromoacetate or dibromoacetate ion, and the anions of general formula: R—COO⁻, such as formates and acetates.

Step s5)

According to step s5), the alumina beads obtained on conclusion of step s4) are calcined at a temperature of between 500° C. and 820° C., preferentially between 550° C. and 750° C., and for a period of time of generally between 1 and 24 hours, preferably between 1 and 6 hours. On conclusion of this step, the alumina beads obtained comprise a specific surface area of between 50 and 210 m²/g, preferably between 70 and 180 m²/g and even more preferentially between 70 and 160 m²/g.

Process for Preparing the Catalyst

The catalyst used in the context of the hydrodesulfurization process according to the invention can be prepared by means of any technique known to those skilled in the art, and notably by impregnation of the group VIII and VIB elements, optionally phosphorus, on the selected support.

According to a first embodiment, said components of metals from group VIB, from group VIII and of phosphorus are deposited on said support, by one or more coimpregnation stages, that is to say that said components of the metals from group VIB, from group VIII and of phosphorus are introduced simultaneously into said support. The co-impregnation step(s) are preferentially performed by dry impregnation or by impregnation in an excess of solution. When this first embodiment comprises the implementation of several co-impregnation steps, each co-impregnation step is preferably followed by an intermediate drying step generally at a temperature of less than 200° C., advantageously of between 50 and 180° C., preferably of between 60 and 150° C., very preferably of between 75 and 140° C.

According to a preferred embodiment by co-impregnation, the impregnation solution is preferably an aqueous solution. Preferably, the aqueous impregnation solution, when it contains cobalt, molybdenum and phosphorus, is prepared under pH conditions which promote the formation of heteropolyanions in solution. For example, the pH of such an aqueous solution is between 1 and 5.

According to a second embodiment, the catalyst precursor is prepared by carrying out the successive depositions, in any order, of a component of a group VIB metal, of a component of a group VIII metal and optionally of phosphorus on said support. The depositions may be carried out by dry impregnation, by excess impregnation or else by deposition-precipitation, according to methods well known to those skilled in the art. In this second embodiment, the deposition of the components of the group VIB and VIII metals and optionally of phosphorus can be carried out by several impregnations with a intermediate drying step between two successive impregnations, generally at a temperature below 200° C., advantageously between 50° C. and 180° C., preferably between 60° C. and 150° C., very preferably between 75° C. and 140° C.

Whatever the mode of deposition of the metals and of the phosphorus employed, the solvent which participates in the composition of the impregnation solutions is chosen so as to dissolve the metal precursors of the active phase, such as water or an organic solvent (for example an alcohol).

Use may be made, by way of example, among the sources of molybdenum, of the oxides and hydroxides, molybdic acids and salts thereof, in particular the ammonium salts, such as ammonium molybdate, ammonium heptamolybdate, phosphomolybdic acid ($H_3PMo_{12}O_{40}$), and salts thereof, and optionally silicomolybdic acid ($H_4SiMo_{12}O_{40}$) and salts thereof. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to those skilled in the art. For example, use may be made, among the sources of tungsten, of the oxides and hydroxides, tungstic acids and salts thereof, in particular the ammonium salts, such as ammonium tungstate, ammonium metatungstate, phosphotungstic acid and salts thereof, and optionally silicotungstic acid ($H_4SiW_{12}O_{40}$) and salts thereof. The sources of tungsten can also be any heteropolycompound of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

The phosphorus can advantageously be introduced into the catalyst at various steps of its preparation and in various ways. The phosphorus can be introduced during the shaping of said alumina support, or preferably after this shaping. It can advantageously be introduced alone or as a mixture with one at least one of the group VIB and VIII metals. The phosphorus is preferably introduced as a mixture with the precursors of the group VIB and group VIII metals, completely or partially onto the shaped alumina support, by dry impregnation of said alumina support using a solution containing the precursors of the metals and the phosphorus precursor. The preferred source of phosphorus is orthophosphoric acid $H_3PO_4$, but its salts and esters, such as ammonium phosphates or mixtures thereof, are also suitable. The phosphorus can also be introduced at the same time as the group VIB element(s) in the form, for example, of Keggin, lacunary Keggin, substituted Keggin or Strandberg-type heteropolyanions.

On conclusion of the step(s) of bringing the group VIB and VIII metals and the phosphorus into contact with the support, the precursor of the catalyst is subjected to a drying step carried out by any technique known to those skilled in the art. It is advantageously carried out at atmospheric pressure or at reduced pressure. Preferably, this step is carried out at atmospheric pressure. This step is carried out at a temperature below 200° C., preferably between 50° C. and 180° C., preferably between 60° C. and 150° C. and very preferably between 75° C. and 140° C.

The drying step is advantageously carried out in a traversed bed using hot air or any other hot gas. Preferably, when the drying is carried out in a traversed bed, the gas used is either air or an inert gas, such as argon or nitrogen. Very preferably, the drying is carried out in a traversed bed in the presence of air.

Preferably, this drying step has a duration of between 30 minutes and 24 hours and preferably of between 1 hour and 12 hours.

On conclusion of the drying step, a dried catalyst is obtained which can be used as hydrotreating catalyst after an activation phase (sulfidation step).

According to an alternative form, the dried catalyst can be subjected to a subsequent calcination stage, for example under air, at a temperature of greater than or equal to 200° C. The calcination is generally carried out at a temperature of less than or equal to 600° C., preferably of between 200° C. and 600° C. and particularly preferably of between 250° C. and 500° C. The calcination time is generally of between 0.5 hour and 16 hours, preferably between 1 hour and 5 hours. It is generally performed in air. Calcination enables the precursors of the group VIB and VIII metals to be converted into oxides.

Before its use as hydrotreating catalyst, it is advantageous to subject the dried or optionally calcined catalyst to a sulfidation step (activation phase). This activation phase is carried out by methods well known to those skilled in the art, and advantageously under a sulfo-reductive atmosphere in the presence of hydrogen and hydrogen sulfide. The hydrogen sulfide can be used directly or generated by a sulfide agent (such as dimethyl disulfide).

Process for Hydrodesulfurization of Gasoline

The hydrotreating process consists in bringing the sulfur-containing olefinic gasoline cut into contact with a catalyst as described above and hydrogen under the following conditions:

a temperature of between 200° C. and 400° C., preferably of between 230° C. and 330° C.;

at a total pressure of between 1 and 3 MPa, preferably of between 1.5 and 2.5 MPa;

an hourly space velocity (HSV), defined as being the volume flow rate of feedstock relative to the volume of catalyst, of between 1 and 10 $h^{-1}$, preferably of between 2 and 6 $h^{-1}$;

a hydrogen/gasoline feedstock volume ratio of between 100 and 600 NI/I, preferably of between 200 and 400 NI/I.

Thus, the process according to the invention makes it possible to treat any type of sulfur-containing olefinic gasoline cut, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracked gasoline). Said feedstock preferably consists of a gasoline cut resulting from a catalytic cracking unit.

The feedstock is advantageously a gasoline cut containing sulfur-comprising compounds and olefins and has a boiling point of between 30° C. and less than 250° C., preferably between 35° C. and 240° C. and in a preferred way between 40° C. and 220° C.

The sulfur content of the gasoline cuts produced by catalytic cracking (FCC) depends on the sulfur content of the feedstock treated by the FCC, on the presence or absence of a pretreatment of the FCC feedstock, and also on the end point of the cut. Generally, the sulfur contents of the whole of a gasoline cut, notably those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, including generally less than 300 ppm of mercaptans. The mercaptans are generally concentrated in the light fractions of the gasoline and more specifically in the fraction having a boiling point of below 120° C.

It should be noted that the sulfur compounds present in the gasoline can also comprise heterocyclic sulfur compounds, such as, for example, thiophenes, alkylthiophenes or benzothiophenes. These heterocyclic compounds, unlike mercaptans, cannot be removed by extractive processes. These sulfur compounds are consequently removed by a hydrotreating, which leads to their transformation into hydrocarbons and $H_2S$.

Preferably, the gasoline treated by the process according to the invention is a heavy gasoline (or HCN for Heavy Cracked Naphtha) resulting from a distillation step aimed at separating a broad cut of the gasoline resulting from a cracking process (or FRCN for Full Range Cracked Naphtha) into a light gasoline (LCN for Light Cracked Naphtha)

and a heavy gasoline HCN. The cut point of the light gasoline and of the heavy gasoline is determined in order to limit the sulfur content of the light gasoline and to make it possible to use it in the gasoline pool, preferably without additional post-treatment. Advantageously, the broad cut FRCN is subjected to a selective hydrogenation step before the distillation step.

EXAMPLES

Example 1: Catalyst a (According to the Invention)

The support S1 of the catalyst A is obtained by dehydration of hydrargillite (Emplura®, Merck) in order to obtain an alumina powder. The temperature is set at 800° C. and the contact time of the material to be dehydrated with a flow of dry air is 1 second. The alumina powder obtained is ground to a particle size of between from 10 to 200 μm and then washed three times with a volume of distilled water equal to twice the volume of the powder used. Said alumina powder is shaped in the presence of carbon black (N990 Thermax®) with a disk pelletizer (GRELBEX P30) equipped with a conical cylindrical pan at an angle of 30° and a rotation speed of 40 rpm so as to obtain beads with a diameter predominantly between 2 and 4 mm after screening the solid. The amount of carbon black is adjusted to obtain a green filling density of the objects of 800 kg/m$^3$. Said beads are subjected to a heat treatment in air at 720° C. so as to give them a specific surface area of 200 m$^2$/g. Next, a hydrothermal treatment is applied to said beads by impregnation of the pore volume with an aqueous solution of nitric acid (0.1N, Merck). The hydrothermal treatment is carried out at a temperature of 200° C. for 6.5 hours, in a rotating basket autoclave. The beads thus obtained are subjected to a final calcination treatment in air at 650° C. for 2 hours. The support S1 has a specific surface area of 141 m$^2$/g, a total pore volume of 0.97 ml/g, and also the following pore distribution given by mercury porosimetry:

a volume of mesopores with a diameter greater than or equal to 2 nm and less than 18 nm, the pore distribution of which is centered on 13 nm, of 0.15 ml/g corresponding to 15% of the total pore volume;

a volume of mesopores with a diameter greater than or equal to 18 nm and less than 50 nm, the pore distribution of which is centered on 26 nm, of 0.43 ml/g corresponding to 44% of the total pore volume;

a volume of macropores with a diameter greater than or equal to 50 nm and less than 8000 nm, of 0.39 ml/g corresponding to 40% of the total pore volume.

The support S1 has a water uptake volume of 0.95 ml/g. The impregnation solution is prepared by heating, at 90° C. for 3 hours, 1.15 g of molybdenum oxide (MoO$_3$>99.5%, Merck), 0.28 g of cobalt hydroxide (95% Co(OH)$_2$, Merck) and 0.26 g of phosphoric acid (85 wt % H$_3$PO$_4$ in water, Merck) in 9.3 ml of distilled water. After dry impregnation of 10 g of support and a step of maturing for 12 hours in a moisture-saturated atmosphere, the solid is dried at 120° C. for 12 hours. The solid is subsequently calcined in air at 450° C. for 2 hours. Catalyst A obtained contains 1.9% by weight of CoO, 10% by weight of MoO$_3$ and 1.4% weight of P$_2$O$_5$ relative to the total weight of the catalyst. Catalyst A has a total pore volume of 0.88 ml/g and a specific surface area of 118 m$^2$/g.

Example 2: Catalyst B (According to the Invention)

Catalyst B is obtained by dry impregnation of the alumina support S1 with an aqueous solution prepared from 1.35 g of ammonium heptamolybdate $((NH_4)_6MO_7O_{24}\cdot 4H_2O$, 99.98%, Merck), 1.38 g of cobalt nitrate $(Co(NO_3)_2\cdot 6H_2O$, 98%, Merck) in 9.4 ml of distilled water. After dry impregnation of 10 g of support and a step of maturing for 12 hours in a moisture-saturated atmosphere, the solid is dried at 120° C. for 12 hours. The solid is subsequently calcined in air at 450° C. for 2 hours. Catalyst B obtained contains 3.1% by weight of coO and 9.6% by weight of $MoO_3$ relative to the total weight of the catalyst. Catalyst B has a total pore volume of 0.89 ml/g and a specific surface area of 124 $m^2/g$.

Example 3: Catalyst C (not in Accordance with the Invention (Macroporous and Monomodal Large Mesoporous Catalyst)

The support S2 of the catalyst C is obtained by dehydration of hydrargillite (Emplura®, Merck) in order to obtain an active alumina powder. The temperature is set at 800° C. and the contact time of the material to be dehydrated with a flow of dry air is 1 second. The active alumina powder obtained is ground to a particle size of between from 10 to 200 μm and then washed three times with a volume of distilled water equal to twice the volume of the powder used. Said active alumina powder is shaped with a disk pelletizer (GRELBEX P30) equipped with a conical cylindrical pan at an angle of 30° and a rotation speed of 40 rpm so as to obtain beads with a diameter predominantly between 2 and 4 mm (after screening the solid) and a green filling density of the objects of 780 $kg/m^3$. Said beads are subjected to a heat treatment in air at 700° C. so as to give them a specific surface area of 250 $m^2/g$. Next, a hydrothermal treatment is applied to said beads by impregnation of the pore volume with an aqueous solution of nitric acid (0.1 N, Merck). The hydrothermal treatment is carried out at a temperature of 200° C. for 6.5 hours, in a rotating basket autoclave. The beads thus obtained are subjected to a final calcination treatment in air at 950° C. for 2 hours. The support S2 has a specific surface area of 71 $m^2/g$, a total pore volume of 0.56 ml/g, and also the following pore distribution given by mercury porosimetry:
    a volume of mesopores with a diameter greater than or equal to 10 nm and less than 50 nm, the pore distribution of which is centered on 20 nm, of 0.35 ml/g corresponding to 63% of the total pore volume;
    a volume of macropores with a diameter greater than or equal to 50 nm and less than 8000 nm, of 0.21 ml/g corresponding to 38% of the total pore volume.

The support S2 has a water uptake volume of 0.54 ml/g. The impregnation solution is prepared by heating, at 90° C. for 3 hours, 1.15 g of molybdenum oxide ($MoO_3>99.5\%$, Merck), 0.28 g of cobalt hydroxide (95% $Co(OH)_2$, Merck) and 0.26 g of phosphoric acid (85 wt % $H_3PO_4$ in water, Merck) in 5.2 ml of distilled water. After dry impregnation of 10 g of support and a step of maturing for 12 hours in a moisture-saturated atmosphere, the solid is dried at 120° C. for 12 hours. The solid is subsequently calcined in air at 450° C. for 2 hours. Catalyst C obtained contains 1.9% by weight of CoO, 10% by weight of $MoO_3$ and 1.4% weight of $P_2O_5$ relative to the total weight of the catalyst. Catalyst C has a total pore volume of 0.47 ml/g and a specific surface area of 62 $m^2/g$.

Example 4: Catalyst D not in Accordance with the Invention (Macroporous Catalyst)

A commercial support S3 (SA52124, UniSpheres® Nor-Pro) in the form of beads with a diameter of between 2 and 4 mm is provided. The support S3 has a specific surface of 8 $m^2/g$, a total pore volume of 0.33 ml/g, and also the following pore distribution given by mercury porosimetry:
    a volume of macropores with a diameter greater than or equal to 50 nm and less than 8000 nm, of 0.33 ml/g corresponding to 100% of the total pore volume.

The support S3 has a water uptake volume of 0.37 ml/g. The impregnation solution is prepared by heating, at 90° C. for 3 hours, 1.15 g of molybdenum oxide ($MoO_3>99.5\%$, Merck), 0.28 g of cobalt hydroxide (95% $Co(OH)_2$, Merck) and 0.26 g of phosphoric acid (85 wt % $H_3PO_4$ in water, Merck) in 3.5 ml of distilled water. After dry impregnation of 10 g of support and a step of maturing for 12 hours in a moisture-saturated atmosphere, the solid is dried at 120° C. for 12 hours. On conclusion of the two impregnation steps, the solid is subsequently calcined in air at 450° C. for 2 hours. Catalyst D obtained contains 1.9% by weight of CoO, 10% by weight of $MoO_3$ and 1.4% weight of $P_2O_5$ relative to the total weight of the catalyst. Catalyst D has a total pore volume of 0.21 ml/g and a specific surface area of 5 $m^2/g$.

Example 5: Catalyst E not in Accordance with the Invention (Monomodal Mesoporous Catalyst)

A commercial support S4 (SA 6578, NorPro) is supplied in the form of 5 mm-diameter extrudate. The support S4 has a specific surface area of 175 $m^2/g$, a total pore volume of 0.82 ml/g, and also the following pore distribution given by mercury porosimetry:
    a volume of mesopores with a diameter greater than or equal to 2 nm and less than or equal to 20 nm, the pore distribution of which is centered on 13 nm, of 0.82 ml/g corresponding to 100% of the total pore volume.

The support S4 has a water uptake volume of 0.81 ml/g. The impregnation solution is prepared by heating, at 90° C. for 3 hours, 1.15 g of molybdenum oxide ($MoO_3>99.5\%$, Merck), 0.28 g of cobalt hydroxide (95% $Co(OH)_2$, Merck) and 0.26 g of phosphoric acid (85 wt % $H_3PO_4$ in water, Merck) in 7.9 ml of distilled water. After dry impregnation of 10 g of support and a step of maturing for 12 hours in a moisture-saturated atmosphere, the solid is dried at 120° C. for 12 hours. The solid is subsequently calcined in air at 450° C. for 2 hours. Catalyst E obtained contains 1.9% by weight of CoO, 10% by weight of $MoO_3$ and 1.4% weight of $P_2O_5$ relative to the total weight of the catalyst. Catalyst E has a total pore volume of 0.74 ml/g and a specific surface area of 136 $m^2/g$.

Example 6: Catalyst F not in Accordance with the Invention (Macroporous and Monomodal Small Mesoporous Catalyst)

A commercial support S5 (SA 6176, NorPro) is supplied in the form of 1.6 mm-diameter extrudate. The support S5 has a specific surface area of 250 $m^2/g$, a total pore volume of 1.05 ml/g, and also the following pore distribution given by mercury porosimetry:
    a volume of mesopores with a diameter greater than or equal to 2 nm and less than or equal to 20 nm, the pore distribution of which is centered on 7 nm, of 0.68 ml/g corresponding to 65% of the total pore volume.
    a volume of macropores with a diameter greater than or equal to 50 nm and less than 8000 nm, of 0.37 ml/g corresponding to 35% of the total pore volume.

The support S5 has a water uptake volume of 1.02 ml/g. The impregnation solution is prepared by heating, at 90° C. for 3 hours, 1.15 g of molybdenum oxide ($MoO_3>99.5\%$, Merck), 0.28 g of cobalt hydroxide (95% Co(OH)$_2$, Merck) and 0.26 g of phosphoric acid (85 wt % H$_3$PO$_4$ in water, Merck) in 10.0 ml of distilled water. After dry impregnation of 10 g of support and a step of maturing for 12 hours in a moisture-saturated atmosphere, the solid is dried at 120° C. for 12 hours. The solid is subsequently calcined in air at 450° C. for 2 hours. Catalyst F obtained contains 1.9% by weight of CoO, 10% by weight of MoO$_3$ and 1.4% weight of P$_2$O$_5$ relative to the total weight of the catalyst. Catalyst F has a total pore volume of 0.87 ml/g and a specific surface area of 211 m$^2$/g.

Example 7: Evaluation of the Performance of the Catalysts Used in a Hydrodesulfurization Reactor In this example, the performance of the catalysts A to F are evaluated in hydrodesulfurization of a catalytic cracking gasoline.

A model feedstock representative of a catalytic cracking (FCC) gasoline containing 10% by weight of 2,3-dimethyl-but-2-ene and 0.33% by weight of 3-methylthiophene (i.e. 1000 ppm by weight of sulfur in the feedstock) is used for the evaluation of the catalytic performance of the various catalysts. The solvent used is heptane.

The hydrodesulfurization (HDS) reaction is carried out in a fixed traversed bed reactor under a total pressure of 1.5 MPa, at 210° C., at HSV=6 h$^{-1}$ (HSV=volume flow rate of feedstock/volume of catalyst) and an H$_2$/feedstock volume ratio of 300 Nl/l, in the presence of 4 ml of catalyst. Prior to the HDS reaction, the catalyst is sulfided in situ at 350° C. for 2 hours under a flow of hydrogen containing 15 mol % of H$_2$S at atmospheric pressure.

Each of the catalysts is placed successively in said reactor. Samples are taken at different time intervals and are ana-lyzed by gas chromatography so as to observe the disap-pearance of the reactants and the formation of the products.

The catalytic performance of the catalysts is evaluated in terms of catalytic activity and of the selectivity. The hydrodesulfurization (HDS) activity is expressed from the rate constant for the HDS reaction of 3-methylthiophene (kHDS), standardized by the volume of catalyst introduced, and assuming first order kinetics with respect to the sulfur compound. The olefin hydrogenation (HydO) activity is expressed from the rate constant for the hydrogenation reaction of 2,3-dimethylbut-2-ene, standardized by the vol-ume of catalyst introduced, and assuming first order kinetics with respect to the olefin.

The selectivity of the catalyst is expressed by the stan-dardized ratio of the rate constants kHDS/kHydO. The kHDS/kHydO ratio will increase as the catalyst becomes more selective.

The values obtained are standardized by taking the cata-lyst A as reference (relative HDS activity and relative selectivity equal to 100). The performance criteria are thus the relative HDS activity and the relative selectivity.

TABLE 1

| | Catalysts | | | | | |
|---|---|---|---|---|---|---|
| | A (in accord-ance) | B (in accord-ance) | C (not in accord-ance) | D (not in accord-ance) | E (not in accord-ance) | F (not in accord-ance) |
| Relative activity | 100 | 98 | 57 | 32 | 97 | 115 |

16

TABLE 1-continued

| | Catalysts | | | | | |
|---|---|---|---|---|---|---|
| | A (in accord-ance) | B (in accord-ance) | C (not in accord-ance) | D (not in accord-ance) | E (not in accord-ance) | F (not in accord-ance) |
| Relative selectivity | 100 | 95 | 107 | 96 | 87 | 76 |

It therefore emerges that the catalysts according to the invention have better performance in terms of activity and selectivity and therefore underlines the importance of the porosity ranges of the catalyst support on performance in a gasoline hydrodesulfurization process. This improvement in the selectivity of the catalysts is particularly advantageous in the case of a process for the hydrodesulfurization of gasoline containing olefins for which it is sought to limit as much as possible the loss of octane due to the hydrogenation of the olefins.

The invention claimed is:

1. A process for hydrodesulfurization of an olefinic gaso-line cut containing sulfur, wherein said olefinic gasoline cut, hydrogen and a catalyst are brought into contact, said hydrodesulfurization process being carried out at a tempera-ture of between 200° C. and 400° C., a total pressure of between 1 and 3 MPa, an hourly space velocity, defined as being the volume flow rate of feedstock relative to the volume of catalyst, of between 1 and 10 h$^{-1}$ and a hydrogen/ olefinic gasoline cut volume ratio of between 100 and 600 Nl/l, said catalyst comprising at least one group VIB metal, at least one group VIII metal, and a mesoporous and macroporous alumina support comprising a bimodal distri-bution of mesopores and wherein:

the volume of mesopores with a diameter greater than or equal to 2 nm and less than 18 nm corresponds to between 10% and 30% by volume of the total pore volume of said mesoporous and macroporous alumina support;

the volume of mesopores with a diameter greater than or equal to 18 nm and less than 50 nm corresponds to between 30% and 50% by volume of the total pore volume of said mesoporous and macroporous alumina support;

the volume of macropores with a diameter greater than or equal to 50 nm and less than 8000 nm corresponds to between 30% and 50% by volume of the total pore volume of said mesoporous and macroporous alumina support.

2. The process as claimed in claim 1, wherein said mesoporous and macroporous alumina support comprises a specific surface area of between 50 and 210 m$^2$/g.

3. The process as claimed in claim 1, wherein said mesoporous and macroporous alumina support comprises a total pore volume of between 0.7 and 1.3 ml/g.

4. The process as claimed in claim 1, wherein the volume of mesopores with a diameter greater than or equal to 2 nm and less than 18 nm corresponds to between 15% and 25% by volume of the total pore volume of said mesoporous and macroporous alumina support.

5. The process as claimed in claim 1, wherein the volume of mesopores with a diameter greater than or equal to 18 nm and less than 50 nm corresponds to between 35% and 45% by volume of the total pore volume of said mesoporous and macroporous alumina support.

6. The process as claimed in claim 1, wherein the volume of macropores with a diameter greater than or equal to 50 nm and less than 8000 nm corresponds to between 35% and 50% by volume of the total pore volume of said mesoporous and macroporous alumina support.

7. The process as claimed in claim 1, wherein the content of the at least one group VIB metal in said catalyst, expressed in oxide form, is between 1% and 30% by weight relative to the total weight of the catalyst.

8. The process as claimed in claim 1, wherein the content of the at least one group VIII metal in said catalyst, expressed in oxide form, is between 0.5% and 10% by weight relative to the total weight of the catalyst.

9. The process as claimed in claim 1, wherein the at least one the group VIII metal is cobalt.

10. The process as claimed in claim 1, wherein the at least one the group VIB metal is molybdenum.

11. The process as claimed in claim 1, wherein said catalyst further comprises phosphorus, the content of phosphorus, expressed in $P_2O_5$ form, is between 0.1% and 10% by weight relative to the total weight of said catalyst.

12. The process as claimed in claim 1, wherein the pore distribution of the mesopores with a diameter greater than or equal to 2 nm and less than 18 nm is centered on a range of values of between 10.5 and 14.5 nm.

13. The process as claimed in claim 1, wherein the pore distribution of the mesopores with a diameter greater than or equal to 18 nm and less than 50 nm is centered on a range of values of between 22 and 28 nm.

14. The process as claimed in claim 1, wherein the olefinic gasoline cut is a catalytic cracking gasoline.

15. The process as claimed in claim 1, wherein the mesoporous and macroporous alumina support is in the form of beads with a diameter of between 2 and 4 mm.

16. The process as claimed in claim 15, wherein said mesoporous and macroporous alumina support is obtained according to the following steps:

s1) dehydrating an aluminum hydroxide or an aluminum oxyhydroxide at a temperature of between 400° C. and 1200° C. for a time of between 0.1 second and 5 seconds to obtain an alumina powder;

s2) shaping said alumina powder obtained in step s1) in the form of beads;

s3) heat treating the alumina beads obtained in step s2) at a temperature above or equal to 200° C.;

s4) hydrothermally treating the alumina beads obtained on conclusion of step s3) by impregnation with water or an aqueous solution, then residence in an autoclave at a temperature of between 100° C. and 300° C.;

s5) calcining the alumina beads obtained on conclusion of step s4) at a temperature of between 500° C. and 820° C.

17. The process as claimed in claim 15, wherein the dehydrating of aluminum hydroxide or aluminum oxyhydroxide is performed at a temperature of between 600° C. and 900° C., for a time of between 0.1 second and 4 seconds, to obtain the alumina powder.

* * * * *